April 14, 1942.  C. V. NEWLIN  2,279,837
CONVEYING DEVICE
Filed June 12, 1941  2 Sheets-Sheet 1
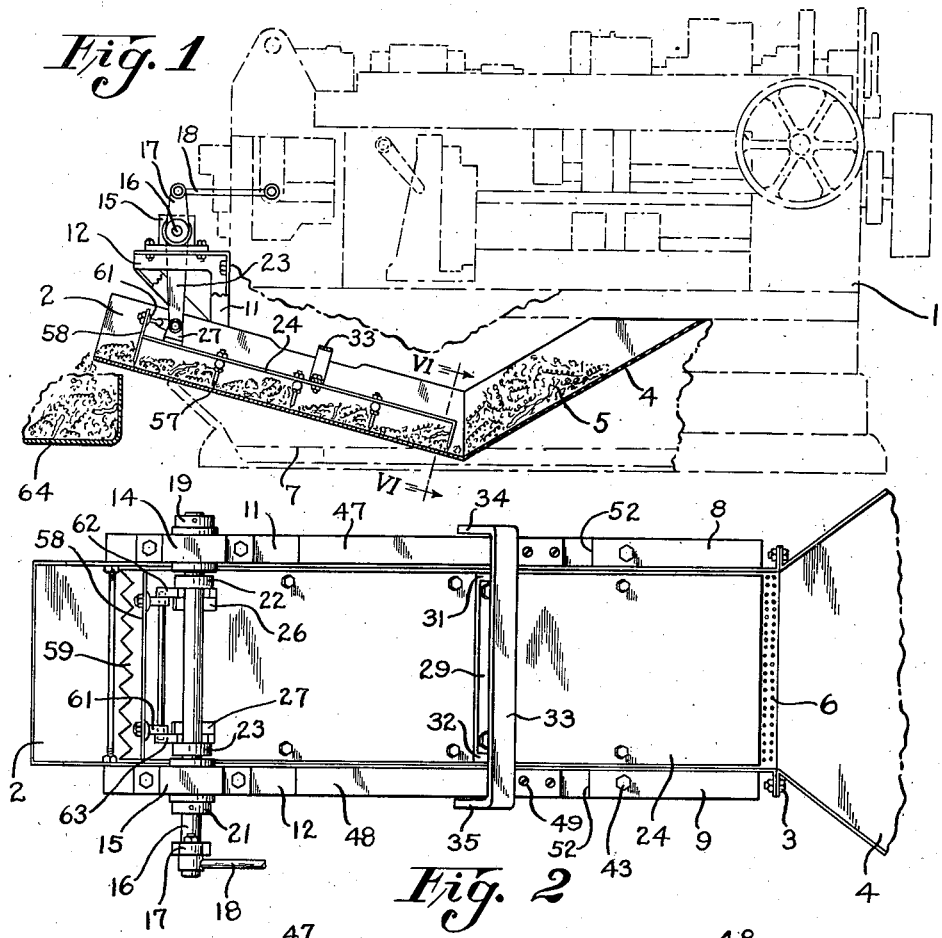
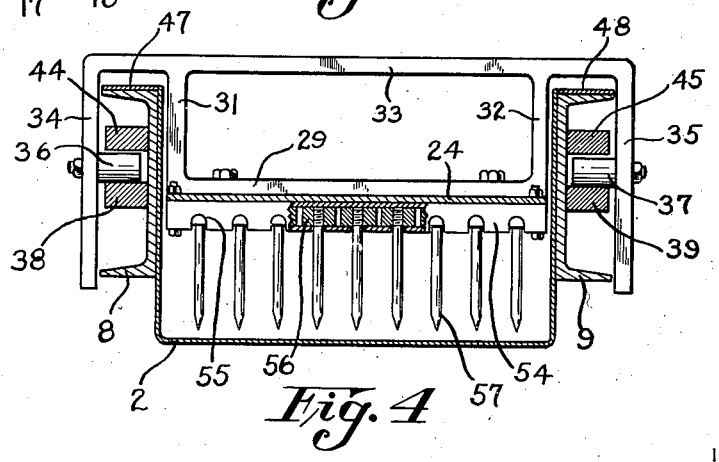
INVENTOR
Clarence V. Newlin
BY Raymond H. Vernes
ATTORNEY April 14, 1942.  C. V. NEWLIN  2,279,837
CONVEYING DEVICE
Filed June 12, 1941  2 Sheets-Sheet 2

INVENTOR
Clarence V. Newlin
BY
ATTORNEY

Patented Apr. 14, 1942

2,279,837

UNITED STATES PATENT OFFICE 2,279,837

CONVEYING DEVICE

Clarence V. Newlin, Detroit, Mich.

Application June 12, 1941, Serial No. 397,678.

5 Claims. (Cl. 198—223)

This invention relates to a conveying device and in particular it relates to a device for removing metallic chips from the base of machines in which chips are formed as a by-product in the manufacturing process of forming machined articles.

It is recognized that heretofore conveying devices have been utilized for removing metallic chips from machines in which chips are produced in the machined formation of a metallic article. However, such conveying devices have usually been in the form of belt type conveyors or such conveyors in which the belt is formed of a metal link mesh band. These devices have proved impractical because of the wide range of sizes and formation in which the chips occur. Some of the chips take the form of long lengths of helical spring-like units, and in the belt type conveyors these units frequently become entwined in the mechanism to such an extent as to render the device inoperative. In accordance with the practice of my invention I provide a conveying device which will function successfully in conveying various size or conformity of chips and will remove such chips easily and uniformly throughout long periods of operation without requiring any attention to the conveying device.

In most cases it is conventional practice to remove the chips from these machines manually by inserting a rake or hooked member into the base of the machine and dragging out the chips in a manual operation. A great many machines employ a cutting oil to facilitate the machining operation. This oil flows down and commingles with the chips. Therefore, in removing the chips from the machine it is desirable not to cause too great a disturbance in the base of the machine because the cutting oil is reclaimed and excessive disturbance at the base of the machine causes the finer metal chips to be held in suspension in the oil, thus being detrimental to subsequently straining and pumping of the cutting oil. It has been demonstrated that the manual removal of chips from the base of such machines causes a substantial disturbance resulting in higher maintenance of screen cleaning and pump repairing. The chip removing device as provided in my invention causes a minimum amount of disturbance in the base of the machine, operates uniformly and at frequent intermittent intervals to remove the chips positively and expeditiously without the assistance of any manual labor.

It is, therefore, among the objects of my invention to provide a conveying device which will successfully remove chips from a metal cutting machine regardless of size or conformity of the chips; to remove such chips without causing excessive disturbance at the base of the machine; to separate cutting oil efficiently from the chips, thereby increasing the amount of oil which may be salvaged; to reduce maintenance on strainers and pumps used in circulating the cutting oil; and, to provide a conveying device which may be manufactured economically and which will operate efficiently throughout long periods of use.

These and other objects and advantages will appear more fully in the following detailed description when considered in connection with the accompanying drawings, in which:

Figure 1 is a side elevational view, in longitudinal section, of a conveying device illustrated in relative position with a machine which produces metallic chips as a by-product;

Figure 2 is a plan view of a portion of the conveying device;

Figure 4 is a transverse view, in section, of the conveying device taken along lines IV—IV of Figure 3;

Figure 3:
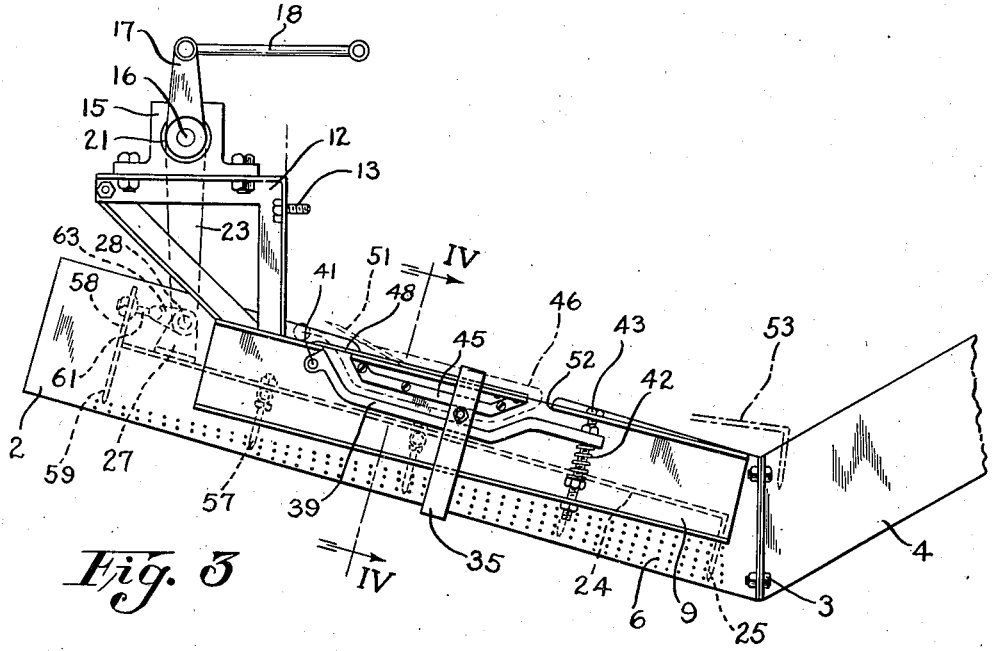
Figure 3 is a side elevational view thereof.

Referring to the drawings and in particular to Figure 1, I show an embodiment of my invention in assembly position with an automatic screw machine 1. It is to be understood, however, that the conveying device of my invention is applicable for use with various types of chip forming machines such as lathes, drill presses, shapers, gear cutting machines and the like. Essentially, the conveying device comprises a U-shaped pan 2 open at the top end and positioned at an angle so that any oil associated with the chips will be drained back to the base of the machine 1. Attached to the pan 2 by means of bolts 3 (Figure 2) is an extension pan 4 which flares outwardly from the pan 2 and serves as a hopper for collecting chips, such as 5, and positioning them in proper location whereat they may be operated upon by the conveying device. The base of the extension pan 4 is positioned at an angle so that the chips 5 will be directed by gravity toward the pan 2. As shown in Figures 2 and 3, substantially the entire bottom portion of the pan 2 and a portion of the sides of the pan 2 contain a plurality of small perforations 6 extending through the wall of the pan for the purpose of permitting cutting oil to be drained from the pan and into the base of the machine. The dot and dash line 7 as indicated in Figue 1 illustrates the level of cutting oil collected at the base of the machine 1.

Attached to either side of the pan 2 are reinforcing channels 8 and 9. Extending from these channels 8 and 9, and attached thereto as by a welding operation, are a pair of brackets 11 and 12, respectively. These brackets serve as means for securing the entire conveying unit to the machine 1 by means of machine screws 13. The brackets 11 and 12 also serve as means for supporting pillow blocks 14 and 15 respectively, for mounting a shaft 16. Extending from the shaft 16 is an arm 17 which is pivotally attached to a connecting rod 18 adapted to engage a portion of the machine 1 which moves intermittently in a reciprocal path. This movement is required to operate the conveying device. In the present instance the connecting rod 18 joins with conventional means associated with the machine 1 which functions to advance stock into the machine 1 for repeating a cycle of its operation. It is to be understood, however, that a conventional power source including independent means may be utilized for providing the desired reciprocal movement for operating the conveying device.

Collars 19 and 21 pinned to the shaft 16 limit the longitudinal movement of the shaft. A pair of levers 22 and 23 also pinned to the shaft 16 extend downwardly and engage with means hereinafter described which serves as the conveying device.

Figure 6:
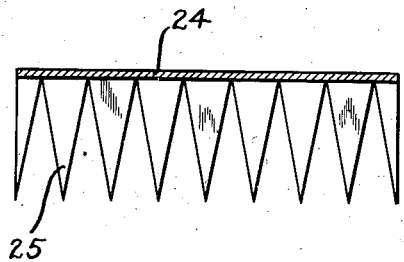
Figure 6 is a transverse view, in section, taken along lines VI—VI of Figure 1 and illustrating the leading chip engaging means of the conveyor.

Located near the pan 2 is a plate member 24 of a length slightly less than the total length of the pan 2 and of a width slightly less than the width of the pan 2. The leading end of the plate 24 is bent downwardly and is cut away to form a plurality of teeth-like members 25, as shown in Figure 6. A pair of brackets 26 and 27 (Figure 2) are attached to the upper surface of the plate 24 near the left end and support a shaft 28. The shaft 28 connects with the lower end of the levers 22 and 23 thus supporting the plate 24 and providing a connection for imparting movement to the plate 24. At an intermediate point along the length of the plate 24 is attached a transversely extending bracket 29 (Figure 4) connecting with upright members 31 and 32 which in turn connect with a transverse member 33. Arms 34 and 35 extend downwardly from transverse member 33 and support cam rollers 36 and 37, respectively. These cam rollers 36 and 37 rest upon lower cam members 38 and 39, respectively, each of which is pivoted to the respective channels 8 and 9 at 41. The opposite end of each of the cam members 38 and 39 are resiliently supported by a spring 42 guided by a bolt 43 attached to the channels 8 or 9 and extending through the respective cam members 38 and 39. In complementary spaced relationship with the cam members 38 and 39 are upper cam guides 44 and 45 attached to the sides of the channels 8 and 9, respectively.

Reciprocating movement of the levers 22 and 23 causes the cams 36 and 37 to follow a path as shown by the dot and dash lines 46 (Figure 3). From the position as shown in Figure 3 the cams move rearwardly until they strike flat spring members 47 and 48 (Figure 2) attached to one end of the upper surface of the channels 8 and 9, respectively, by means of machine screws 49. As the cams strike the spring members 47 and 48, the members move upwardly to the position 51 (Figure 3) thus allowing the cams to move past the spring members 47 and 48 and to rest upon the top of the channels 8 and 9. In the advance stroke the cams move along the top of the spring members 47 and 48 until they reach the end of these members and drop through an opening 52 through the top of the channels 8 and 9. As the cams drop through the opening the springs 42 are utilized to absorb the impact of the drop.

As the plate 24 follows the movement of the cams 36 and 37, to which they are indirectly attached, the plate 24 moves backward and forward in a reciprocal motion. However, in the forward movement the leading edge of the plate, as indicated at 53 (Figure 3), is elevated so that it will raise the teeth 25 above the chips 5 with which they are engageable. As the cams reach the opening 52 the teeth 25 drop and engage with the chips 5 where they are forced down and rearwardly by the action of the cam mechanism.

Figure 7:
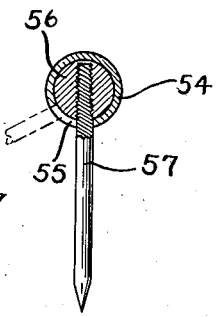
Figure 7 is a side elevational view, partly in section, of one of the chip removing prongs.

Due to the relatively short stroke of the plate 24 and its associated teeth 25, a plurality of additional means are provided throughout the length of the plate 24 for moving the chips progressively out the end of the pan 2. As shown in Figures 4 and 7 a tubular member 54 is attached transversely to the under side of the plate 24 and is provided with a plurality of slots 55. A plurality of short and loosely fitting plugs 56 are positioned within the tubular member 54, and a prong 57 extends through each of the slots 55 and is secured to the plugs 56 by a threaded engagement. By this arrangement the prongs operate independently and are movable in one direction so that in the advance movement of the plate 24 the prongs will swing backward and over the chips 5 with which they engage. Upon the withdrawing movement, the prongs 57 straighten out at right angles with the plate 24 and with the movement of the plate 24 cause the chips 5 to be moved progressively toward the exit of the pan 2. A plurality of these units are employed along the length of the plate 24.

Figure 5:
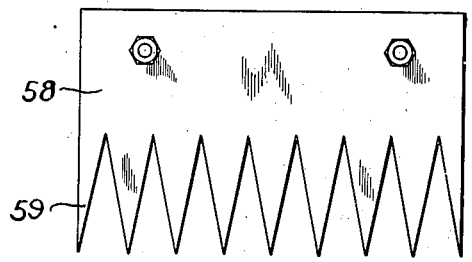
Figure 5 is an end view of a plate forming the last chip engaging means of the conveyor.

At the exit end of the plate 24 a vertically disposed plate 58 having teeth 59 is provided (Figures 1 and 5). This plate 58 is provided with brackets 61 which are pivotally attached to brackets 62 and 63 (Figure 2) forming an extension of the brackets 26 and 27.

As thus described, a reciprocating movement of the plate 24 as determined by the cam mechanism causes an advancing movement of the plate 24 in which the leading portion becomes elevated until the beginning of its rearward movement at which time all of the prongs and teeth associated with the plate 24 engage with the chips 5 to move the chips progressively toward the exit end of the pan 2 whereat the chips flow into a storage container 64.

From the foregoing description it is believed apparent that I have provided a novel and positive means for removing chips from machines in an effective manner, and while I have shown and described a preferred embodiment of my invention it is to be understood that it is susceptible of those modifications which are apparent and which appear within the scope of the invention as defined by the appended claims.

Having thus described my invention what I claim and desire to protect by Letters Patent is:

1. A conveying device comprising a pan having an open end, a plate spaced from the bottom of the pan and reciprocally movable within the pan, a cam roller secured to the plate, a cam located at the side of the pan for engaging the roller and for supporting the plate and for determining the path of movement of the plate, a lever pivotally attached to the plate for supporting one end of the plate and for reciprocally actuating the plate, and a plurality of prongs extending downwardly from the plate, said cam comprising a lower cam member and an upper cam member, said upper cam member normally closing the cam path but being automatically movable by the cam to provide a cam surface for the cam roller during forward movement of the plate, and said upper cam member having an opening at the end of the forward stroke of said plate for permitting the cam roller to engage the lower cam member, and resilient means for cushioning one end of the lower cam member.

2. A conveying device comprising a pan having an open end, a plate spaced from the bottom of the pan and reciprocally movable within the pan, a single cam roller secured to each side of the plate, a cam located at each side of the pan for engaging the rollers and for supporting the plate and for determining the path of movement of the plate, a lever pivotally attached to the plate for supporting one end of the plate and for reciprocally actuating the plate, and a plurality of prongs extending downwardly from the plate, said cam comprising a lower cam member and an upper cam member, and means attached to the upper cam member for bridging the cam path between the upper and lower cam members during the forward stroke of the cam roller.

3. A conveying device comprising a pan having an open end, a plate spaced from the bottom of the pan and reciprocally movable within the pan, a single cam roller secured to each side of the plate, a cam located at each side of the pan for engaging the rollers and for supporting the plate and for determining the path of movement of the plate, a lever pivotally attached to the plate for supporting one end of the plate and for reciprocally actuating the plate, and a plurality of prongs extending downwardly from the plate, said cam comprising a lower cam member and an upper cam member, and means attached to the upper cam member for bridging the cam path between the upper and lower cam members during the forward stroke of the cam roller, said means being movable out of the cam path by the cam roller during the backward stroke of the cam roller.

4. A conveying device comprising a pan having an open end, a plate spaced from the bottom of the pan and reciprocally movable within the pan, a single cam roller secured to each side of the plate, a cam located at each side of the pan for engaging the roller and for supporting the plate and for determining the path of movement of the plate, a lever pivotally attached to the plate for supporting one end of the plate and for reciprocally actuating the plate, a plurality of prongs extending downwardly from the plate, means for permitting backward movement of at least some of said prongs upon forward movement of the plate, and means for limiting the prongs to a position at right angles to the plate upon backward movement of the plate, said cam comprising a lower cam member and an upper cam member, and means attached to the upper cam member for bridging the cam path between the upper and lower cam members during the forward stroke of the cam roller.

5. A conveying device comprising a pan having an open end, a plate spaced from the bottom of the pan and reciprocally movable within the pan, a single cam roller secured to each side of the plate, a cam located at each side of the pan for engaging the roller and for supporting the plate and for determining the path of movement of the plate, a lever pivotally attached to the plate for supporting one end of the plate and for reciprocally actuating the plate, a plurality of prongs extending downwardly from the plate, means for permitting backward movement of at least some of said prongs upon forward movement of the plate, and means for limiting the prongs to a position at right angles to the plate upon backward movement of the plate, said cam comprising a lower cam member and an upper cam member, and means attached to the upper cam member for bridging the cam path between the upper and lower cam members during the forward stroke of the cam roller, said means being movable out of the cam path by the cam roller during the backward stroke of the cam roller.

CLARENCE V. NEWLIN.